(12) United States Patent
Yigzaw et al.

(10) Patent No.: US 9,904,586 B2
(45) Date of Patent: Feb. 27, 2018

(54) INTERFACING WITH BLOCK-BASED STORAGE IN A PROCESSOR

(71) Applicant: Intel Corporation, Santa Clara, CA (US)

(72) Inventors: Theodros Yigzaw, Sherwood, OR (US); Mohan J. Kumar, Aloha, OR (US); Hisham Shafi, Akko (IL); Ron Gabor, Hertzliya (IL); Ashok Raj, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/925,131

(22) Filed: Oct. 28, 2015

(65) Prior Publication Data

US 2017/0123872 A1 May 4, 2017

(51) Int. Cl.
| | |
|---|---|
| *G11C 29/00* | (2006.01) |
| *G06F 11/07* | (2006.01) |
| *G06F 9/30* | (2018.01) |
| *G06F 12/00* | (2006.01) |

(52) U.S. Cl.
CPC .......... *G06F 11/079* (2013.01); *G06F 9/3004* (2013.01); *G06F 9/3016* (2013.01); *G06F 9/30101* (2013.01); *G06F 11/0721* (2013.01); *G06F 11/0784* (2013.01);
(Continued)

(58) Field of Classification Search
CPC .. G06F 11/079; G06F 9/3016; G06F 11/0721; G06F 11/0787; G06F 17/30519; G06F 17/30345; G06F 3/0613; G06F 3/0667; G06F 3/0679; G06F 3/0685; G06F 3/067; G06F 12/08; G06F 11/1446;
(Continued)

(56) References Cited

U.S. PATENT DOCUMENTS

| | | | | |
|---|---|---|---|---|
| 5,148,545 | A * | 9/1992 | Herbst | ................... G06F 13/368 710/240 |
| 5,822,615 | A * | 10/1998 | Yamashita | ......... G05B 19/0423 700/9 |
| 6,085,339 | A | 7/2000 | Jeddeloh | |

(Continued)

FOREIGN PATENT DOCUMENTS

WO 01-29672 4/2001

OTHER PUBLICATIONS

U.S. Appl. No. 14/845,503, filed Sep. 4, 2015, entitled "Clearing Poison Status on Read Accesses to Volatile Memory Regions Allocated in Non-Volatile Memory," by Raj K. Ramanujan, et al.

(Continued)

*Primary Examiner* — Guerrier Merant
(74) *Attorney, Agent, or Firm* — Trop, Pruner & Hu, P.C.

(57) ABSTRACT

In one embodiment, a processor includes a core having a fetch unit to fetch instructions, a decode unit to decode the instructions, and one or more execution units to execute the instructions. The core may further include: a first pair of block address range registers to store a start location and an end location of a block range within a non-volatile block storage coupled to the processor; and a block status storage to store an error indicator responsive to an occurrence of an error within the block range during a block operation. Other embodiments are described and claimed.

17 Claims, 10 Drawing Sheets

(52) U.S. Cl.
CPC ...... *G06F 11/0787* (2013.01); *G06F 11/0793* (2013.01); *G06F 12/00* (2013.01)

(58) Field of Classification Search
CPC ............. G06F 11/1474; G06F 11/2023; G06F 11/2071; G06F 11/1012
See application file for complete search history.

(56) References Cited

U.S. PATENT DOCUMENTS

| | | | |
|---|---|---|---|
| 8,645,623 B1* | 2/2014 | O'Shea | G06F 12/0866 711/100 |
| 9,112,537 B2* | 8/2015 | Ramirez | G06F 11/1064 |
| 2002/0034104 A1 | 3/2002 | Roohparvar | |
| 2007/0028039 A1* | 2/2007 | Gupta | G11C 15/00 711/108 |
| 2009/0055602 A1* | 2/2009 | von Wendorff | G06F 12/1458 711/154 |
| 2010/0153676 A1* | 6/2010 | Kawamura | H03K 19/17728 711/170 |
| 2011/0173505 A1 | 7/2011 | Bae et al. | |
| 2011/0173637 A1* | 7/2011 | Brandwine | G06F 9/5072 719/314 |
| 2011/0238939 A1 | 9/2011 | Kuo et al. | |
| 2011/0252186 A1* | 10/2011 | Dinker | G06F 17/30519 711/103 |
| 2014/0181620 A1* | 6/2014 | Kotzur | G06F 11/1068 714/764 |
| 2014/0337562 A1* | 11/2014 | Long | G06F 3/0659 711/103 |
| 2015/0254136 A1* | 9/2015 | Hoya | G06F 11/1012 714/764 |
| 2015/0318058 A1* | 11/2015 | Curley | G06F 12/0253 714/41 |
| 2015/0378928 A1* | 12/2015 | Greiner | G06F 12/0891 711/133 |

OTHER PUBLICATIONS

International Searching Authority, "Notification of Transmittal of the International Search Report and the Written Opinion of the International Searching Authority," dated Dec. 19, 2016 in International application No. PCT/US2016/053094.

* cited by examiner

INTERFACING WITH BLOCK-BASED STORAGE IN A PROCESSOR

BACKGROUND

Many computing systems are implemented using multiple different types of memory and storage, including local volatile memory to enable access at high speeds for frequently or recently used information. Instead, infrequently used information may be stored in more distant portions of a storage hierarchy, oftentimes in a non-volatile storage. System complexity increases difficulties in accessing these different types of memories, which often have different characteristics, including different access techniques, error handling techniques and so forth.

DETAILED DESCRIPTION

Figure 1:
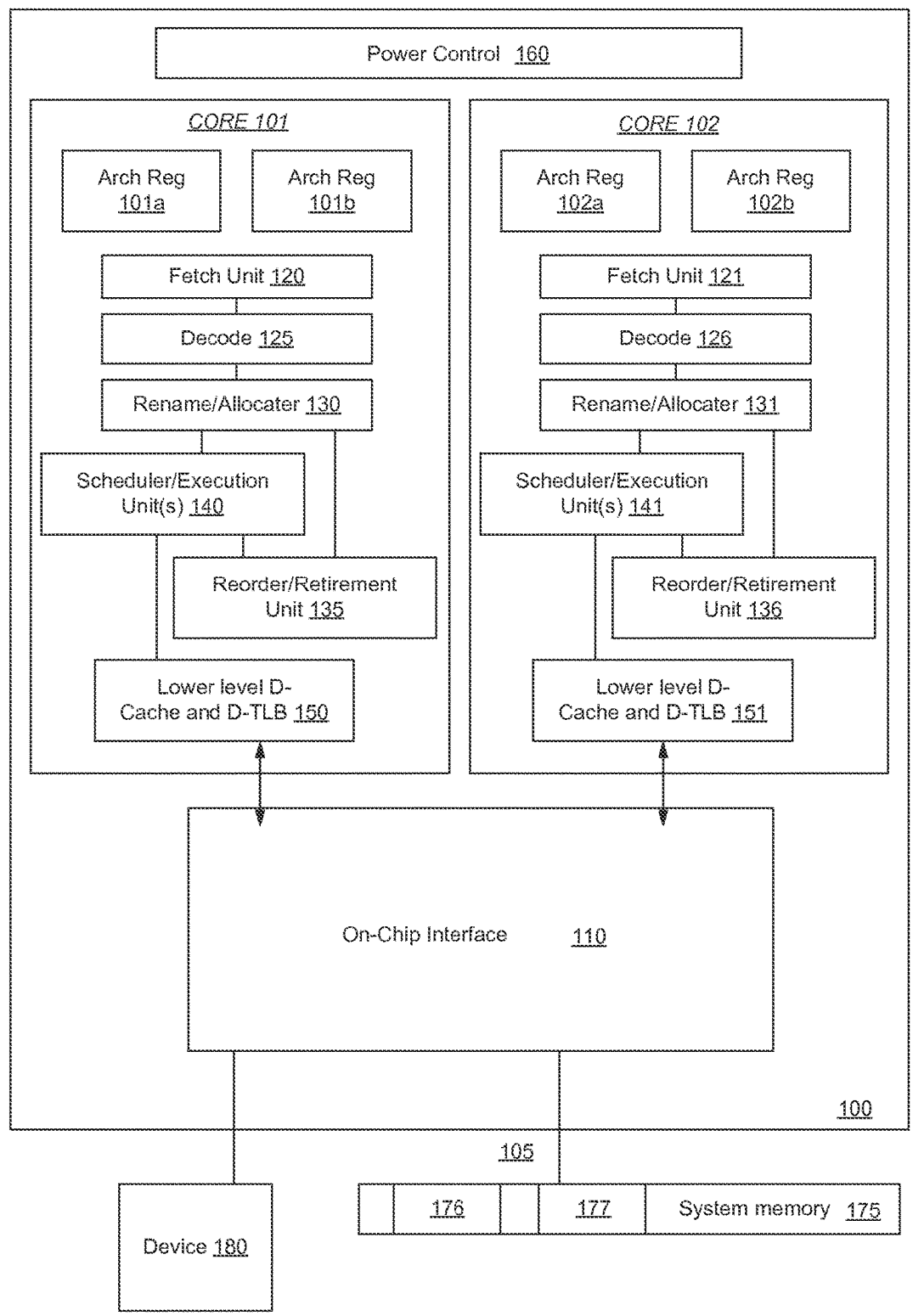
FIG. 1 is a block diagram for a computing system including a multicore processor in accordance with an embodiment of the present invention.

In various embodiments, a memory/storage arrangement is realized in which a non-volatile memory (NVM) can support multiple modes of operation, including volatile memory, persistent memory (application direct memory) and block mode storage (platform attached storage). More specifically in embodiments, a given NVM technology can be used to support multiple modes of operation concurrently. In addition, the different portions of this NVM allocated to the different modes of operation all may be accessed using a system address space, to provide greater efficiency and faster access. This is the case even for block mode operation of this NVM. Embodiments further enable this block mode portion of the NVM to leverage persistent memory error handling techniques, to improve efficiency and performance.

In one embodiment, a non-volatile storage may be configured to support the following concurrent operation modes: volatile memory; persistent memory (application-direct); and block mode (platform attached storage). The latter two modes are used in a storage context. Persistent memory (PM) mode is a large capacity memory region with persistency attribute, and block mode is a large capacity non-volatile memory pool with block/solid state disk (SSD) attribute.

Persistent memory is addressable from a system address space as controlled by one or more system address decoders of a system, and is cache coherent. The PM region is exposed to applications, and as such the application is expected to manage movement of data from volatile regions to PM regions. Since the PM is addressable through the system address space, the application can use typical load/store semantics (and existing memory attributes and ordering rules) to target the PM region. In addition, error handling for the PM region is generally similar to volatile region error handling because accesses are carried out in the system address space. For example, errors may be reported to an operating system (OS) of the platform for handling.

Using embodiments as described herein, a block region of the non-volatile storage also may be addressable from the system address space. Note that the non-volatile storage natively may instead manage this block region by a block driver that uses a block aperture (a description of address range), block command and status registers to carry out transactions. The block driver carries out block read and write transactions by programming a block window (BW) command register and then polls the status register to determine the status of the operation. Error handling in block mode (BM) in a conventional usage of a non-volatile storage is quite different. In such usage, any error encountered during a block operation is reported in the status register, and the block driver is expected to handle any errors through the status registers.

Using the system address space is inherently more efficient and faster. As such, embodiments may be configured to perform all persistent operations in the system address space. To this end, embodiments provide techniques to handle persistent mode error handling different than the above-described native error handling. In embodiments, techniques may be realized to enable higher efficiency and performance, as all block regions may be accessed using system physical addressing along with corresponding techniques to enable errors to be handled that fit into that mold.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SoC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic circuitry to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 150, execution unit(s) 140, and portions of reorder/retirement unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer of a fetch unit 120 to predict branches to be executed/taken and an instruction-translation buffer (I-TLB) also of fetch unit 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode module 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices, as will be described further herein. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as an SoC, each of these devices may be incorporated on processor 100. For example in one embodiment, a memory controller hub is on the same package and/or die with processor 100. Here, a portion of the core (an uncore portion) 110 includes one or more controller(s) for interfacing with other devices such as memory 175 or a graphics device 180. The configuration including an interconnect and controllers for interfacing with such devices is often referred to as an uncore configuration. As an example, on-chip interface 110 includes a ring interconnect for on-chip communication and a high-speed serial point-to-point link 105 for off-chip communication. Yet, in the SoC environment, even more devices, such as the network interface, co-processors, memory 175, graphics processor 180, and any other known computer devices/interface may be integrated on a single die or integrated circuit to provide small form factor with high functionality and low power consumption.

Figure 2:
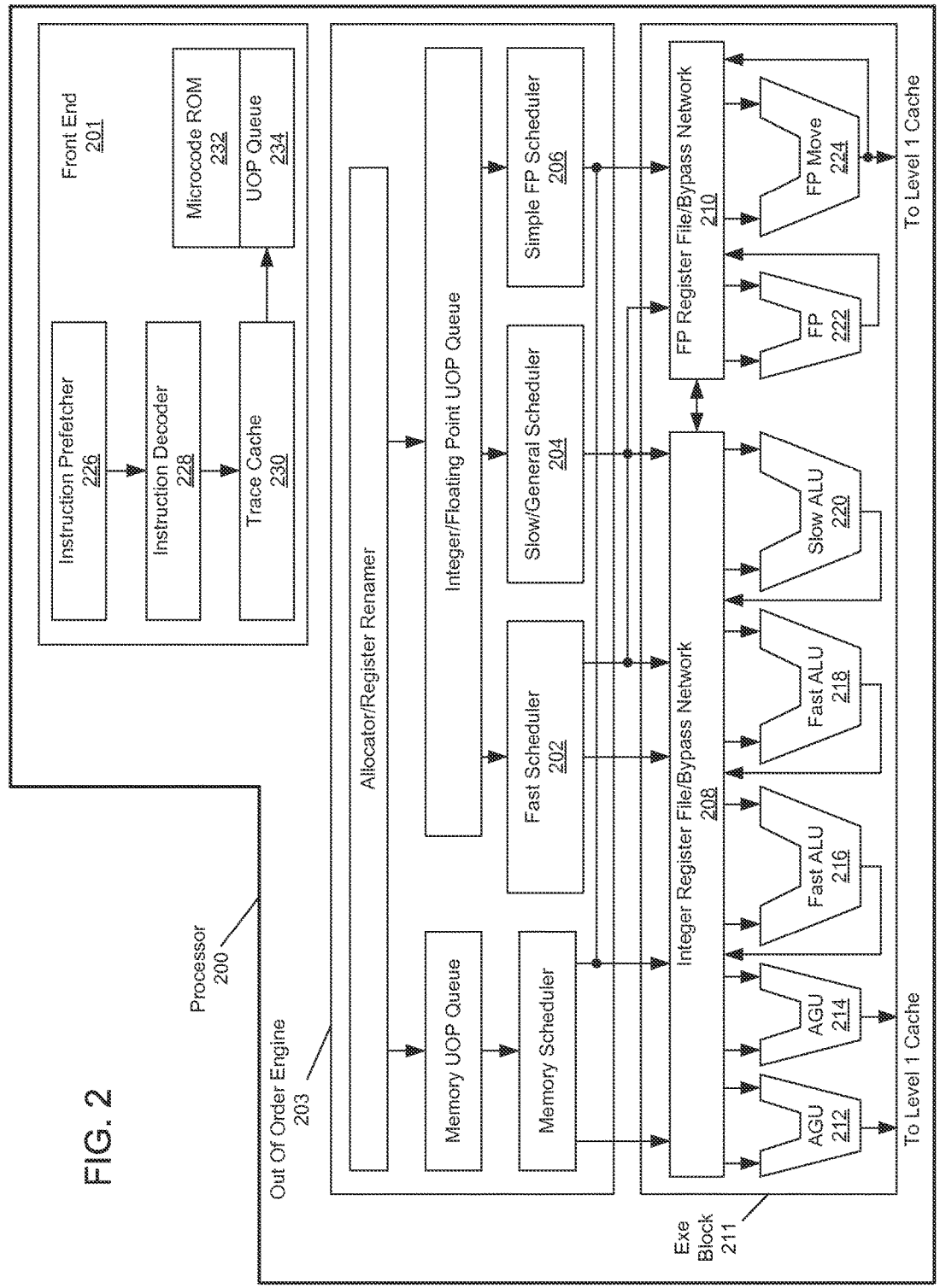
FIG. 2 is a block diagram of a micro-architecture of a processor in accordance with one embodiment of the present invention.

FIG. 2 is a block diagram of a micro-architecture for a processor that includes logic circuits to perform instructions in accordance with an embodiment of the present invention. In some embodiments, instructions can be implemented to operate on data elements having sizes of byte, word, double-word, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

Figure 3:
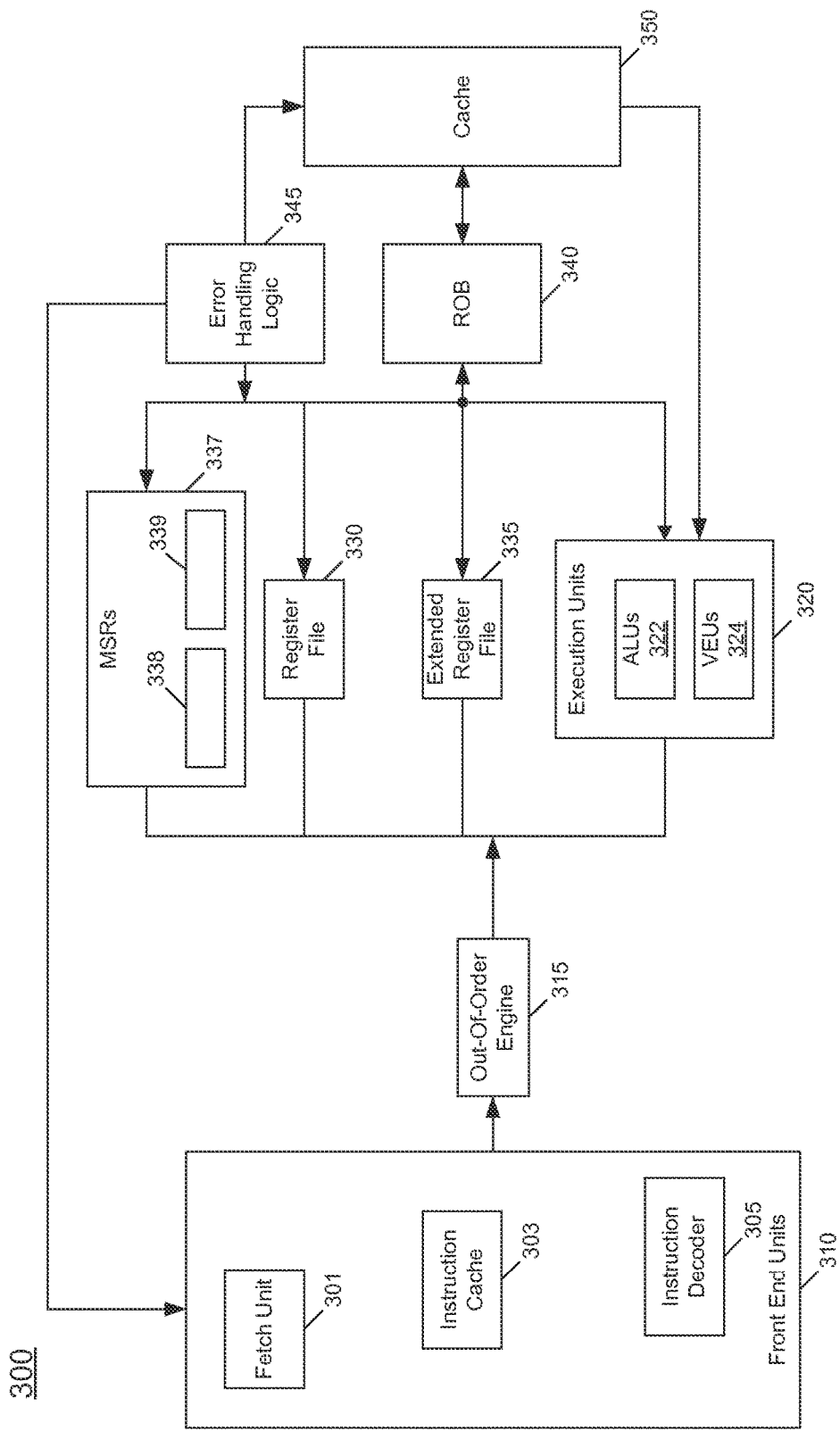
FIG. 3 is a block diagram of a micro-architecture of a processor core in accordance with one embodiment of the present invention.

Referring now to FIG. 3, shown is a block diagram of a micro-architecture of a processor core in accordance with one embodiment of the present invention. As shown in FIG. 3, processor core 300 may be a multi-stage pipelined out-of-order processor. Core 300 may operate at various voltages based on a received operating voltage, which may be received from an integrated voltage regulator or external voltage regulator.

As seen in FIG. 3, core 300 includes front end units 310, which may be used to fetch instructions to be executed and prepare them for use later in the processor pipeline. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. For purposes of configuration, control, and additional operations, a set of machine specific registers (MSRs) 337 may also be present and accessible to various logic within core 300 (and external to the core).

Of note here, MSRs 337 include a set of block address range registers 338. In an embodiment, a set of two such address range registers may be provided for each logical processor. These address range registers may be programmed by software to set up a block address range corresponding to a start address position and an end address position for a block within a platform attached storage implemented in a block mode. In addition, MSRs 337 further include a set of block status registers 339. Each block status register may be associated with a given logical processor and may be used to provide status information regarding a block range associated with the particular logical processor. As will be described herein, such status registers may be used to store state information regarding block operations being performed within the corresponding block range. Also, understand while these block-based registers are included in MSRs 337, in other cases these registers can be located elsewhere in a core.

Various resources may be present in execution units 330, including, for example, various integer, floating point, and single instruction multiple data (SIMD) logic units, among other specialized hardware. For example, such execution units may include one or more arithmetic logic units (ALUs) 322 and one or more vector execution units 324, among other such execution units.

Results from the execution units may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 3, ROB 340 is coupled to a cache 350 which, in one embodiment may be a low level cache (e.g., an L1 cache) although the scope of the present invention is not limited in this regard. Also, execution units 320 can be directly coupled to cache 350. From cache 350, data communication may occur with higher level caches, system memory and so forth. In addition, an error handling logic 345 may be configured to receive error indications and perform various error handling. More specifically herein, error handling logic 345 may prevent escalation of an error occurring within a programmed block range, while escalating errors that occur outside of such ranges. For block range-based errors, error handling logic 345 may store error information within block status registers 339, to enable a given application to handle such errors.

While shown with this high level in the embodiment of FIG. 3, understand the scope of the present invention is not limited in this regard. For example, while the implementation of FIG. 3 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Embodiments enable system software to access persistent block data via the system address space. More specifically, software informs the core of the address range that it wants to move. Processor hardware may be configured to ensure that errors that occur within this address range are handled as follows: such errors do not bring the system down; such errors are not reported through a conventional error escalation mechanism (e.g., machine check architecture (MCA)); the processor continues to make forward progress; and occurrence of such errors are marked in a status register. By fulfilling these criteria, block mode accesses may be handled within a block access software paradigm.

To execute a block access operation, software first designates the block range to be moved by programming registers in a core. Accesses for the block access operation (e.g., a block move operation) are then issued by the software using typical load/store mechanisms in the system address space. If an error occurs during this operation, the NVM controller returns a fault indication to the core. Responsive to such fault indication, the core first determines whether the fault occurred within the programmed block range. If the error happened outside of the programmed block range, processor error handling logic may be configured to handle the error through the normal error handling path, where the error is logged and escalated to the platform or other error handling entity to either pursue a recovery path or bring down the system. If the error occurred within the programmed block range, then the error is neither logged nor escalated to the OS or platform through the normal error handling path. Instead, the block status register for that logical processor is marked to indicate that an error occurred. Software then may access this status register for completion and to determine whether the block move operation completed successfully or not. If the move operation completed with a failure, then software may handle the failure in a similar fashion as it did during block moves, with a block move driver. Meaning, once the software reads the status register, the handling of failures can be performed in a manner similar to a block move driver.

Figure 4:
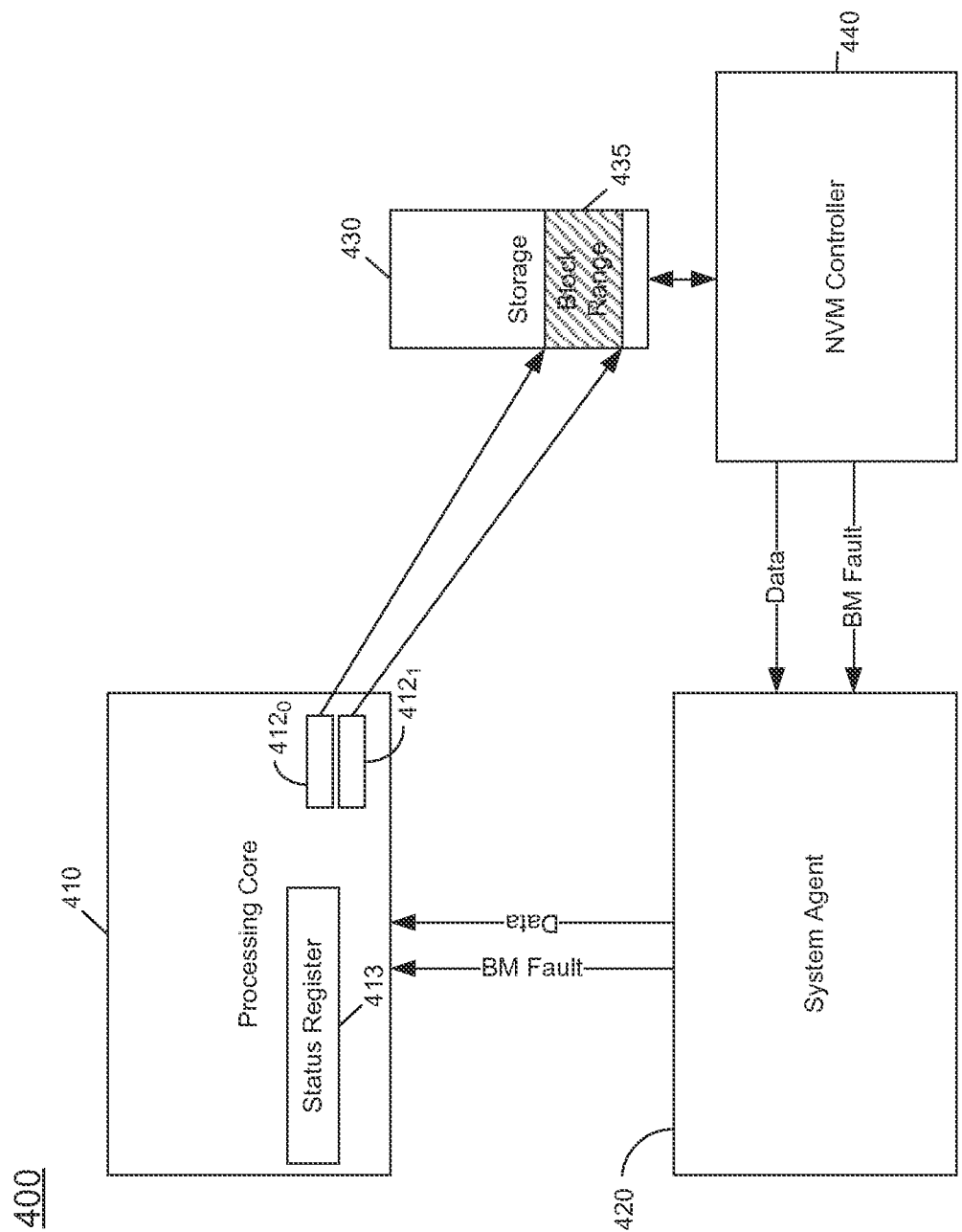
FIG. 4 is a block diagram of a portion of a system in accordance with an embodiment.

Referring now to FIG. 4, shown is a block diagram of a portion of a system in accordance with an embodiment. As shown in FIG. 4, system 400 includes a processing core 410. Understand that while a single core 410 is shown for ease of illustration, in many implementations core 410 may be part of a multicore processor or other SoC including multiple homogeneous and/or heterogeneous cores. As seen, core 410 includes a first block address register 412$_0$ and a second block address range register 412$_1$. In an embodiment, address range registers 412$_0$ and 412$_1$ may be associated with a given logical processor and may be used to define a block range within an attached storage. More specifically as shown in FIG. 4, processing core 410 couples to a storage 430, which may be a non-volatile memory, e.g., including flash memory. In addition, a block status register 413 is shown, also associated with this logical processor. Understand that there may be multiple sets of status registers and address range registers, each associated with a given logical processor. Status register 413 may be configured to store status information associated with block operations involving block range 435 within storage 430 (and associated with corresponding address range registers 412$_0$ and 412$_1$).

As further illustrated in system 400, a system agent 420 couples to core 410. In various embodiments, system agent 420 may include various processing circuitry external to a processor core. As such, system agent 420 may include one or more cache memories, including a shared cache memory to be shared by multiple cores, interface circuitry, peripheral control circuitry, memory controller circuitry, security circuitry, interconnect circuitry and so forth. A non-volatile memory (NVM) controller 440 is coupled to storage 430. In an embodiment, NVM controller 440 may be associated with storage 430. In one embodiment, NVM controller 440 may be implemented as a separate integrated circuit (IC) of a non-volatile storage device including storage 430 (such as a circuit board or add-in card including multiple non-volatile storage components (e.g., multiple flash storage ICs and possibly volatile memory ICs)) which in an embodiment may be implemented as a memory module (such as a non-volatile dual inline memory module (NVDIMM)).

To perform a block access such as a block move operation, software may program the block to be moved via address range registers 412$_0$ and 412$_1$. Accesses for the block move operation may then be issued by software using conventional load/store mechanisms in a system address space (using mapping according to a system address decoder within core 410). Should an error occur during such block operations, the error may be communicated from storage 430 to NVM controller 440, which in turn may communicate the error as a block mode (BM) fault to system agent 420, which in turn may communicate this fault to core 410.

In an embodiment, rather than immediately raising an error to higher level software such as system software, the error may be noted in corresponding status register 413. Note that a similar path is provided to enable communication of data between storage 430 and core 410 (via NVM controller 440 and system agent 420). Understand while shown at this high level in the embodiment of FIG. 4, many variations and alternatives are possible.

Figure 5:
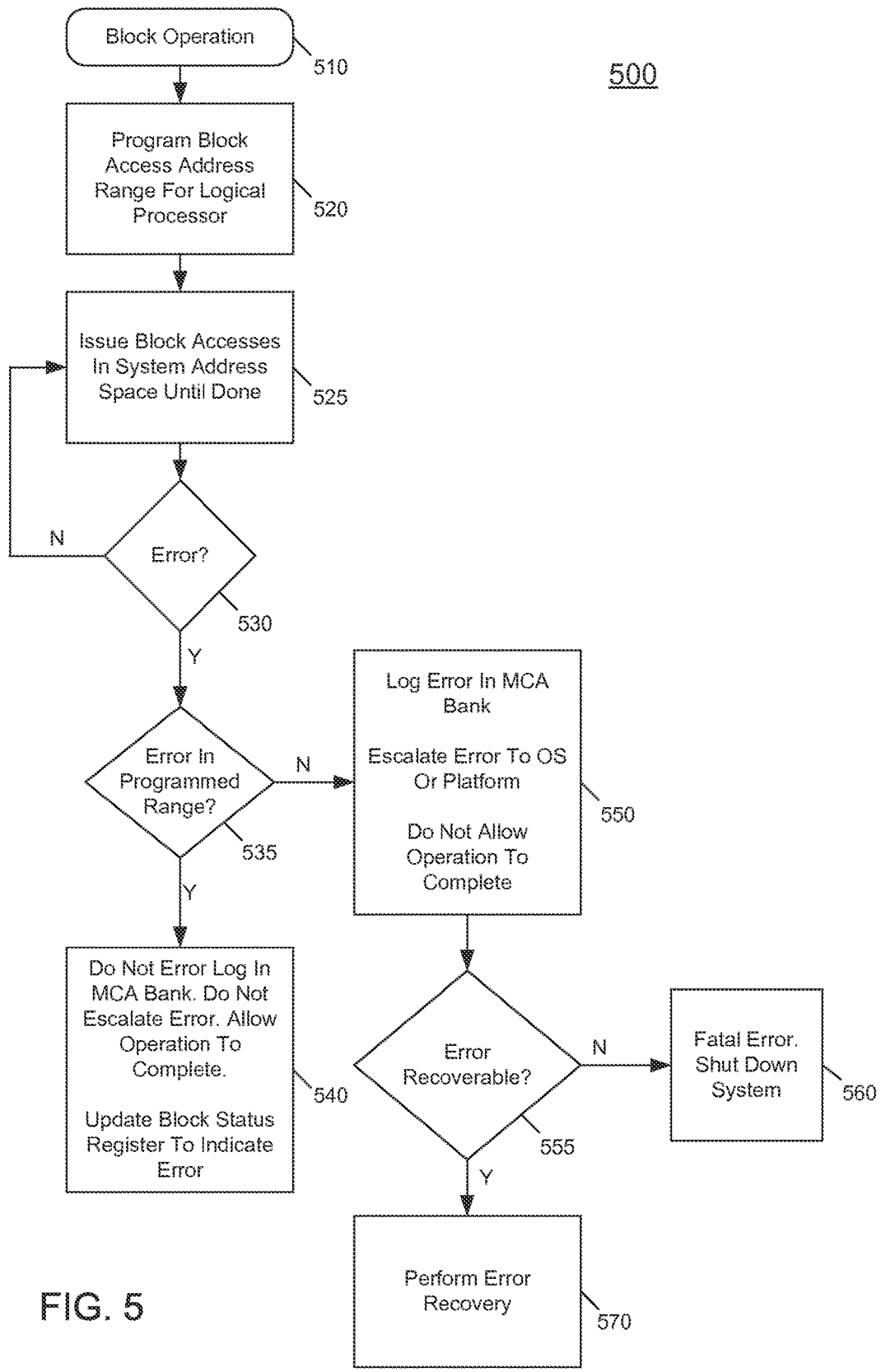
FIG. 5 is a flow diagram of a method in accordance with an embodiment of the present invention.

Referring now to FIG. 5, shown is a flow diagram of a method in accordance with an embodiment of the present invention. As shown in FIG. 5, method 500 may be performed within a computer system having a block-based non-volatile storage as described herein. Method 500 may be performed by combinations of hardware, software, and/or firmware, including circuitry within a processor core such as error handling logic, system agent circuitry and NVM controller circuitry, in addition to software executing on such devices. As seen, method 500 can be initiated responsive to a request for a block operation (block 510). As examples, such block operation may be a request for a read or write access to a block-based storage.

At block 520 a block access address range can be programmed. More specifically, an address range for a given logical processor associated with a thread that issues the block operation is programmed. Although the scope of the present invention is not limited in this regard, in an embodiment these address range registers may be implemented as one or more MSRs within a processor core. Next at block 525 one or more block accesses may be issued in system address space until the requested block operation is fully completed. To effect such block accesses, memory mappings may occur by providing address locations of the block accesses to a system address decoder, which maps these software-issued addresses into system address space.

During such accesses it is determined whether an error has occurred (diamond 530). In an embodiment, such error may be indicated by various means, including an interrupt signal, an error signal or so forth, which may be received within an error handling logic of a processor from any one of a wide variety of locations. Responsive to detection of an error, control passes to diamond 535 to determine whether the error is within the block-based storage range within the block-based storage as previously programmed by software in block 520. This determination may be made based on information made available about the error which may include, without loss of generality, the address where the error occurred, the type of error, whether the error is recoverable or other particulars about the error.

If it is determined that the error is within the programmed error range, control passes to block 540. There, the status MSR may be updated to indicate this error. As an example one or more bits of the status register may be set to indicate the type of error, pass/fail status of the whole transaction, and possibly other information. Note that this is the only response to the error. That is, there is no error handling in a machine check architecture (MCA) logic of the processor. As such, there is no escalation of the error, e.g., to system software such as an OS or firmware-based error handling mechanism. Accordingly, the operation is allowed to complete and the system is not brought down, as may normally happen in such error scenarios. For example, software of the executing application which issued the block operation may be used to handle the error, such as re-issuing the block operation (or portion having an error) to determine whether it can successfully complete in another iteration, or may perform another application-internal error handling technique. Note that if such application-based software error handling technique is not successful, then an MCA error may be thereafter raised.

Still with reference to FIG. 5, if instead it is determined that the error (identified at diamond 530) is not within the programmed range (as determined at diamond 535), control passes to block 550. At block 550, conventional error handling may be performed. More specifically an error may be logged in MCA logic of the processor. As such, this error may be escalated to the OS and/or platform and the operation is not allowed to complete. At this point, MCA or other system-wide error handling is performed. If control reaches block 550 then it has determined that the operation was not part of a block-based operation, i.e., since it lies outside of the range that software programmed as the block range, and thus should be handled in the conventional manner. As such, the error is escalated to MCA and as shown in block 555, a determination is made whether the error is recoverable or not. If it is recoverable then recovery is performed, otherwise the system is brought down. Namely, at diamond 555 it is determined whether the error is recoverable. If so, control passes to block 570 where the error recovery may be performed. Otherwise if it is determined that the error is not recoverable, control passes to block 560 where the error may be classified as a fatal error, and fatal error processing may be performed, such as performing a system shutdown.

Understand while shown at this high level in the embodiment of FIG. 5, many variations and alternatives are possible.

Embodiments thus enable block mode operation to be used on persistent memory at high performance while meeting associated error reporting requirements. Understand that embodiments may be used with a variety of non-volatile storage media, including but not limited to NVDIMM solutions that materialize persistent memory, such as NVDIMM-F, NVDIMM-N, resistive random access memory, Intel® 3DXPoint™-based memory, and memristor-based solutions. In some cases, such technologies may include a block mode driver. Via the address space and error handling techniques described herein, such bock-based technologies can implement storage behavior, such that an error does not bring down the system, improving reliability availability scalability (RAS).

Figure 6:
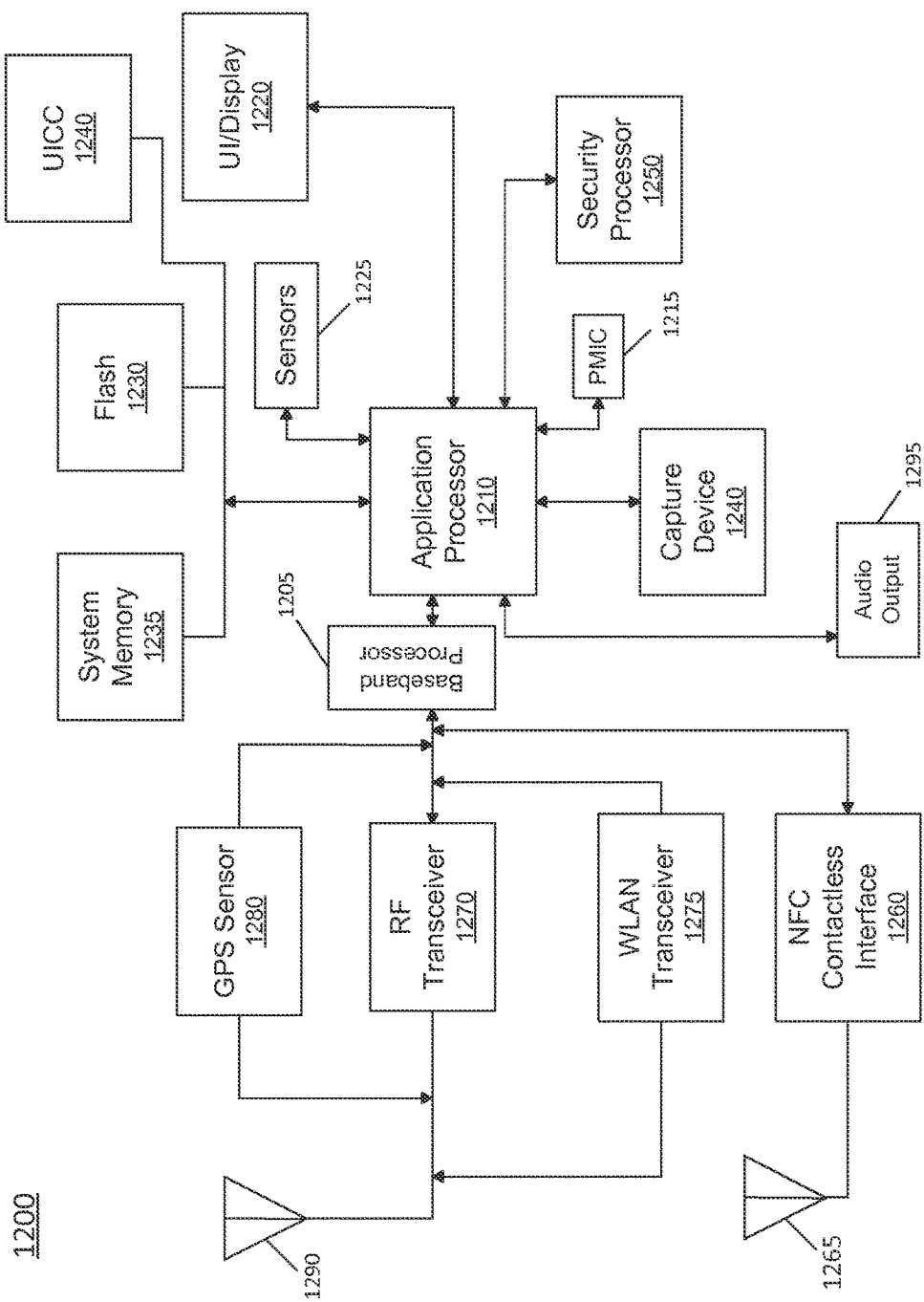
FIG. 6 is a block diagram of an example system with which embodiments can be used.

Referring now to FIG. 6, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235, one or more which may be implemented to be controlled with block-based storage as described herein. As further seen, application processor 1210 further couples to a capture device 1240 such as one or more image capture devices that can record video and/or still images.

Still referring to FIG. 6, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 6, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 7:
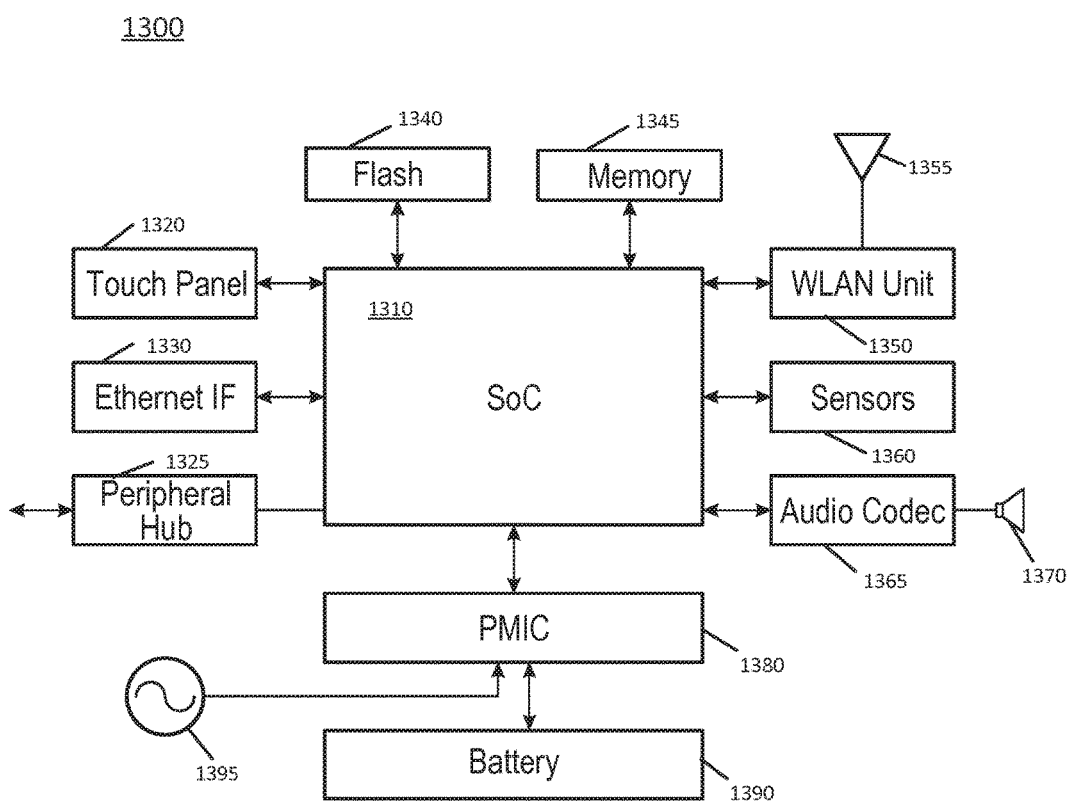
FIG. 7 is a block diagram of another example system with which embodiments may be used.

Referring now to FIG. 7, shown is a block diagram of another example system with which embodiments may be used. In the illustration of FIG. 7, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310, one or more which may be to be controlled with block-based storage as described herein. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 7, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 7, many variations and alternatives are possible.

Figure 8:
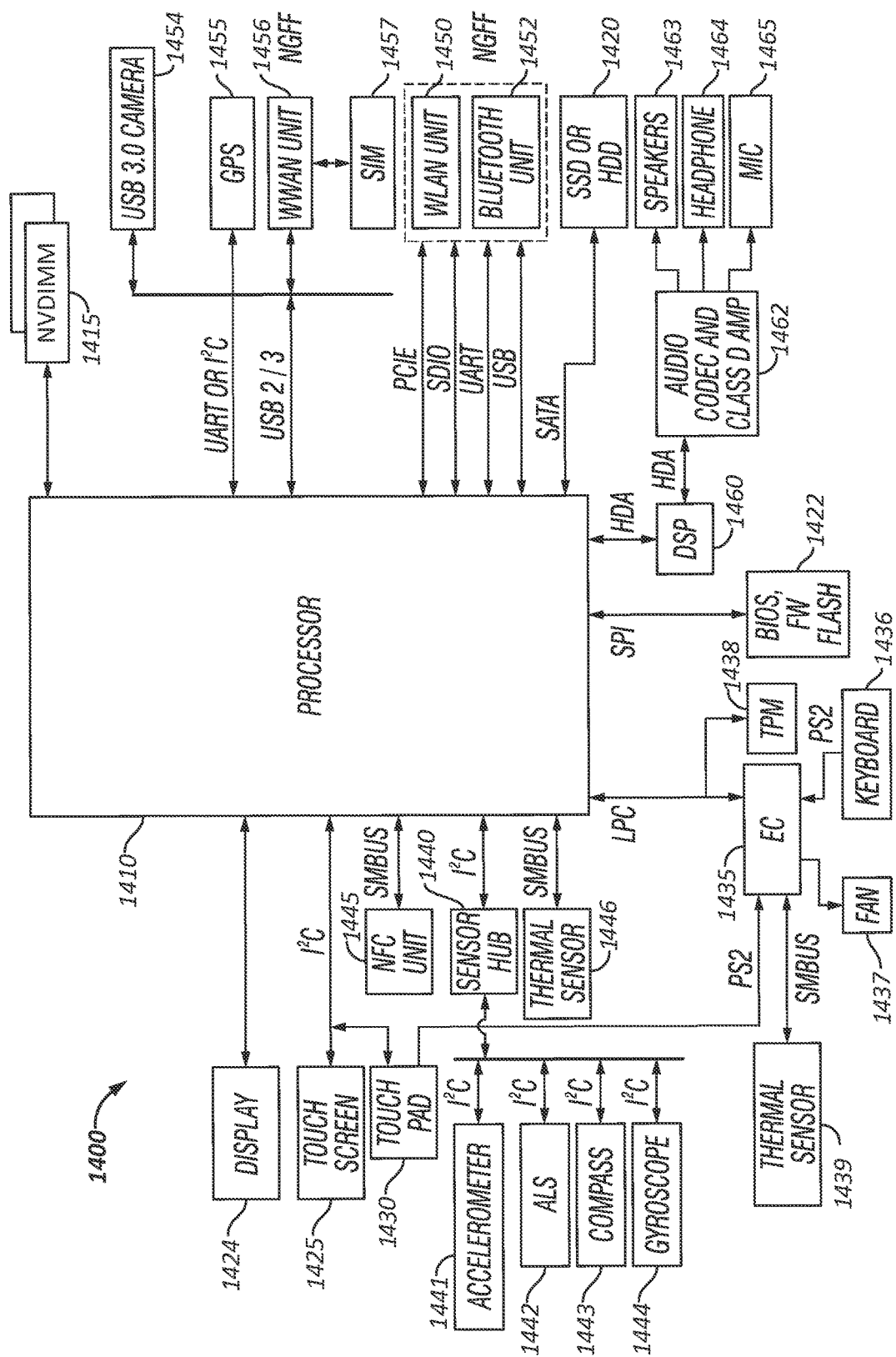
FIG. 8 is a block diagram of a representative computer system.

Referring now to FIG. 8, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC.

Processor 1410, in one embodiment, communicates with a system memory 1415. As an illustrative example, the system memory 1415 is implemented via multiple memory devices or modules, and may include block-based storage to be controlled as described herein, to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 8, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 8 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 8, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 8, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 8, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 8, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 8, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 8, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 8, understand the scope of the present invention is not limited in this regard.

Figure 9:
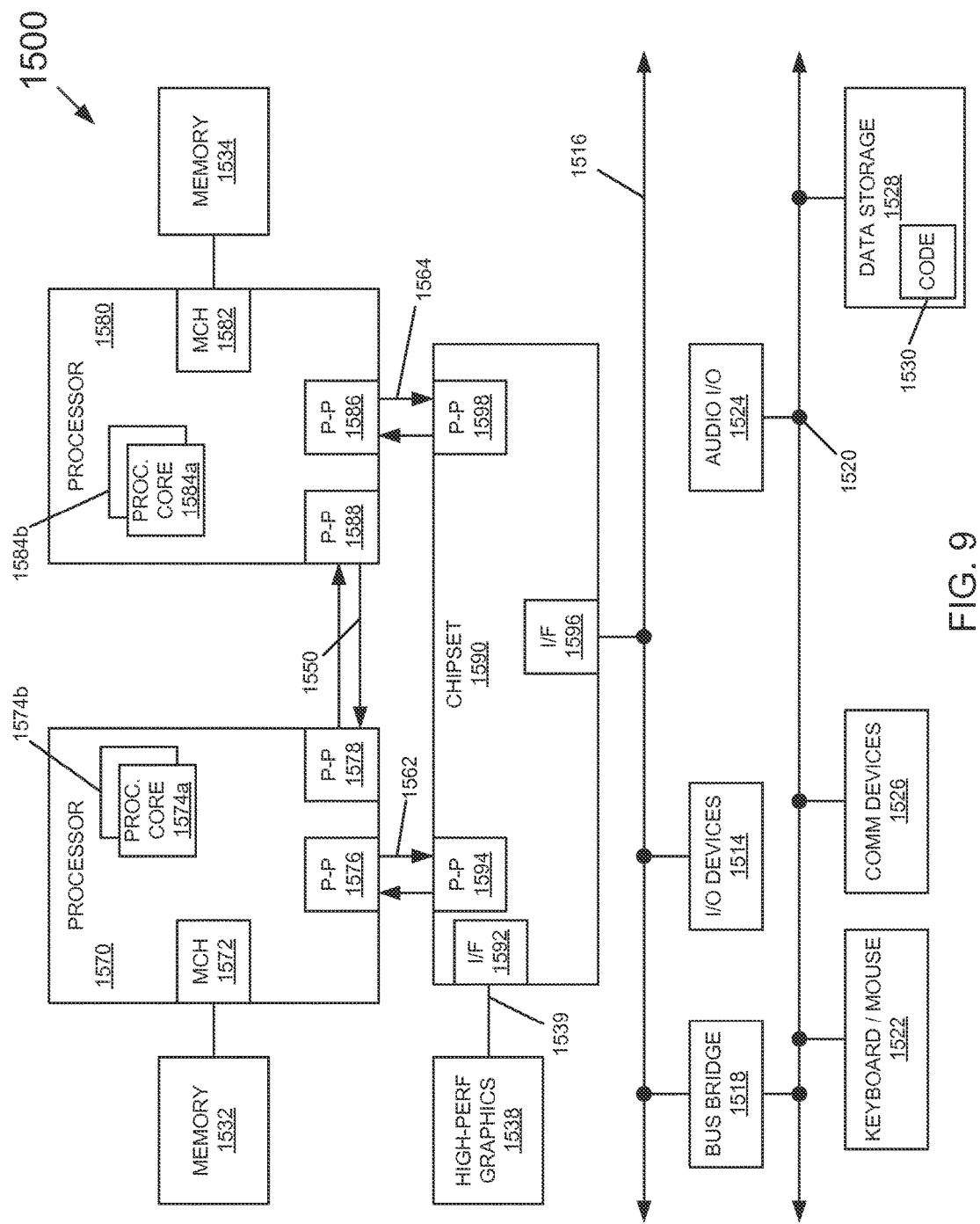
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 1500 is a point-to-point interconnect system, and includes a first processor 1570 and a second processor 1580 coupled via a point-to-point interconnect 1550. As shown in FIG. 9, each of processors 1570 and 1580 may be multicore processors, including first and second processor cores (i.e., processor cores 1574a and 1574b and processor cores 1584a and 1584b), although potentially many more cores may be present in the processors.

Still referring to FIG. 9, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 9, MCH's 1572 and 1582 couple the processors to respective memories, namely a memory 1532 and a memory 1534, which may be portions of system memory that implement block-based storage as described herein. First processor 1570 and second processor 1580 may be coupled to a chipset 1590 via P-P interconnects 1562 and 1564, respectively. As shown in FIG. 9, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 9, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 10:
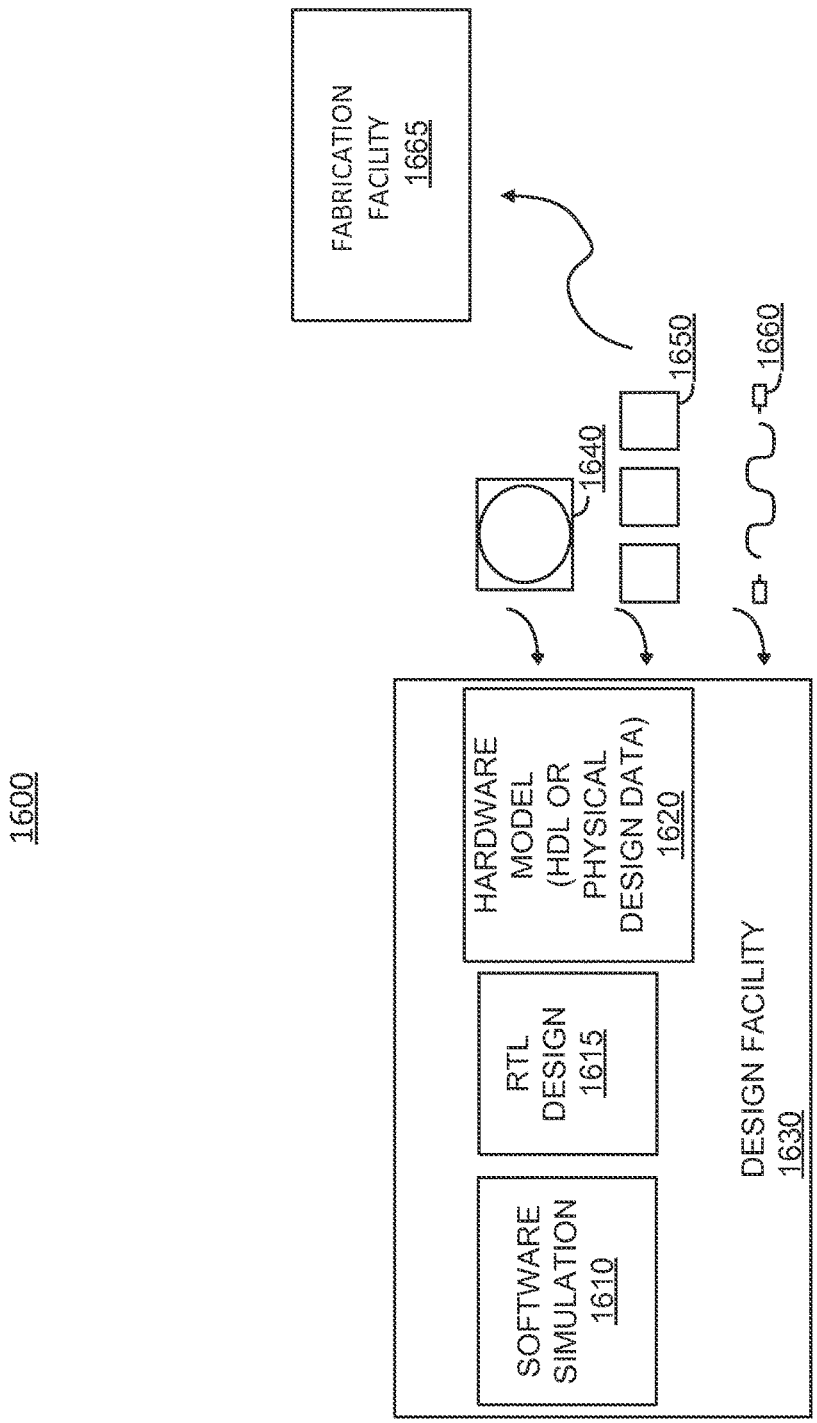
FIG. 10 is a block diagram illustrating an IP core development system used to manufacture an integrated circuit to perform operations according to an embodiment.

FIG. 10 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

The following examples pertain to further embodiments.

In one example, a processor comprises: a core having a fetch unit to fetch instructions, a decode unit to decode the instructions, and one or more execution units to execute the instructions. The core may further comprise: a first pair of block address range registers to store a start location and an end location of a block range within a non-volatile block storage coupled to the processor; and a block status storage to store an error indicator responsive to an occurrence of an error within the block range during a block operation.

In an example, the processor further comprises a system address decoder to map memory operations to a system address space, where the system address decoder is to map the block range within the non-volatile block storage to the system address space.

In an example, the processor further comprises an error handler logic, where the error handling logic is to not escalate the error responsive to the error occurrence within the block range. The error handler logic may escalate a second error, where the second error occurred outside of the block range, where the escalation of the second error is to cause a fatal error if the second error is not recoverable.

In an example, the processor further comprises a plurality of pairs of block address range registers, where each pair of block address range registers is associated with a logical processor.

In an example, the processor further comprises a plurality of block status storages, where each of the plurality of block status storages is associated with a logical processor. The block status storage may be a machine specific register.

In an example, an application that issued the block operation is, responsive to the error indicator stored in the block status storage, to handle the error.

In an example, the processor further comprises a system agent circuit to receive an indication of the error within the block range from a non-volatile controller coupled to the non-volatile block storage and to report the error to the core, the core to store the error indicator in the block status storage responsive to the error report.

In an example, the non-volatile block storage comprises: a first portion to volatilely store first information in a volatile memory mode; a second portion to persistently store second information in a persistent memory mode; and a third potion to block store third information in a storage mode.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: receiving an indication of an error in an error handling logic of a processor; determining if the error occurred within a block range of a block storage coupled to the processor, based at least in part on address information stored in a plurality of block address range registers of the processor; and responsive to determining that the error occurred within the block range, updating a block status storage to indicate the error, to inform an application associated with the block operation regarding the error.

In an example, the method further comprises if the error did not occur within the block range, logging the error in the error handling logic of the processor and escalating the error to a system error handler, to handle the error if the error is recoverable and otherwise to cause a system to be disabled.

In an example, the method further comprises programming at least some of the plurality of block address range registers responsive to receipt of a request by the application for the block operation.

In an example, the method further comprises issuing a plurality of block accesses for the block operation in a system address space.

In an example, the method further comprises enabling the application to handle the error, and allowing the block operation to complete.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a processor including a core having a first pair of block address range registers associated with a first logical processor to store information to identify a start location and an end location of a block range within a non-volatile block storage, and a block status storage associated with the first logical processor to store an error indicator responsive to an occurrence of an error within the block range during a block operation; and the non-volatile block storage coupled to the processor, the non-volatile block storage to concurrently operate in a volatile memory mode to store first information volatilely, a persistent memory mode to store second information persistently, and a storage mode to store third information.

In an example, the core further comprises a system address decoder to map a first region of the non-volatile block storage to operate in the volatile memory mode to a system address space, map a second region of the non-volatile block storage to operate in the persistent memory mode to the system address space, and map a third region of the non-volatile block storage to operate in the storage mode to the system address space.

In an example, an application that issued the block operation is, responsive to the error indicator stored in the block status storage, to handle the error without escalation to an error handler logic of the processor, where the error handler logic is to handle a second error that occurred outside of the block range, and cause a fatal error if the second error is not recoverable.

In an example, the non-volatile block storage further comprises a non-volatile memory controller, one or more volatile memory devices to store the first information, and one or more non-volatile storage devices to store the second information and the third information.

In an example, the processor further comprises a system agent circuit to receive an indication of the error within the block range from the non-volatile memory controller and report the error to the core, the core to store the error indicator in the block status storage responsive to the error report.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core having a fetch unit to fetch instructions, a decode unit to decode the instructions, and one or more execution units to execute the instructions, the core further comprising:
      a first pair of block address range registers to store a start location and an end location of a block range within a non-volatile block storage coupled to the processor;
      a block status storage to store an error indicator responsive to an occurrence of an error within the block range during a block operation; and
      an error handler logic, wherein the error handler logic is to not escalate the error to system software responsive to the error occurrence within the block range and escalate a second error to the system software, wherein the second error occurred outside of the block range, wherein the escalation of the second error is to cause a fatal error if the second error is not recoverable.

2. The processor of claim 1, further comprising a system address decoder to map memory operations to a system address space, wherein the system address decoder is to map the block range within the non-volatile block storage to the system address space.

3. The processor of claim 1, further comprising a plurality of pairs of block address range registers, wherein each pair of block address range registers is associated with a logical processor.

4. The processor of claim 3, further comprising a plurality of block status storages, wherein each of the plurality of block status storages is associated with a logical processor.

5. The processor of claim 1, wherein the block status storage comprises a machine specific register.

6. The processor of claim 1, wherein an application that issued the block operation is, responsive to the error indicator stored in the block status storage, to handle the error.

7. The processor of claim 1, wherein the processor further comprises a system agent circuit to receive an indication of the error within the block range from a non-volatile controller coupled to the non-volatile block storage and to report the error to the core, the core to store the error indicator in the block status storage responsive to the error report.

8. The processor of claim 1, wherein the non-volatile block storage comprises:
   a first portion to volatilely store first information in a volatile memory mode;
   a second portion to persistently store second information in a persistent memory mode; and
   a third portion to store third information in a block storage mode.

9. A machine-readable medium having stored thereon data, which if used by at least one machine, causes at least one machine to fabricate at least one integrated circuit to perform a method comprising:
   receiving an indication of an error in an error handling logic of a processor;
   determining if the error occurred within a block range of a block storage coupled to the processor, based at least in part on address information stored in a plurality of block address range registers of the processor;
   responsive to determining that the error occurred within the block range, updating a block status storage to indicate the error and not further handling the error, to inform an application associated with the block operation regarding the error; and
   responsive to determining that the error did not occur within the block range, logging the error in the error handling logic of the processor and escalating the error to a system error handler, to handle the error if the error is recoverable and otherwise to cause a system to be disabled.

10. The machine-readable medium of claim 9, wherein the method further comprises programming at least some of the plurality of block address range registers responsive to receipt of a request by the application for the block operation.

11. The machine-readable medium of claim 10, wherein the method further comprises issuing a plurality of block accesses for the block operation in a system address space.

12. The machine-readable medium of claim 9, wherein the method further comprises enabling the application to handle the error, and allowing the block operation to complete.

13. A system comprising:
   a processor including a core having a first pair of block address range registers associated with a first logical processor to store information to identify a start location and an end location of a block range within a non-volatile block storage, and a block status storage associated with the first logical processor to store an error indicator responsive to an occurrence of an error within the block range during a block operation, and an error handler logic, wherein the error handler logic is to not escalate the error to system software responsive to the error occurrence within the block range and escalate a second error to the system software, wherein the second error occurred outside of the block range, wherein the escalation of the second error is to cause a fatal error if the second error is not recoverable; and the non-volatile block storage coupled to the processor, the non-volatile block storage to concurrently operate in a volatile memory mode to store first information volatilely, a persistent memory mode to store second information persistently, and a block storage mode to store third information.

14. The system of claim 13, wherein the core further comprises a system address decoder to map a first region of the non-volatile block storage to operate in the volatile memory mode to a system address space, map a second region of the non-volatile block storage to operate in the persistent memory mode to the system address space, and map a third region of the non-volatile block storage to operate in the block storage mode to the system address space.

15. The system of claim 13, wherein an application that issued the block operation is, responsive to the error indicator stored in the block status storage, to handle the error without escalation to the error handler logic of the processor.

16. The system of claim 13, wherein the non-volatile block storage further comprises a non-volatile memory controller, one or more volatile memory devices to store the first information, and one or more non-volatile storage devices to store the second information and the third information.

17. The system of claim 16, wherein the processor further comprises a system agent circuit to receive an indication of the error within the block range from the non-volatile memory controller and report the error to the core, the core to store the error indicator in the block status storage responsive to the error report.

\* \* \* \* \*